(12) United States Patent
Katayama

(10) Patent No.: US 9,500,919 B2
(45) Date of Patent: Nov. 22, 2016

(54) LIQUID CRYSTAL DISPLAY DEVICE

(71) Applicant: Japan Display Inc., Tokyo (JP)

(72) Inventor: Atsuhiro Katayama, Tokyo (JP)

(73) Assignee: Japan Display Inc., Tokyo (JP)

( * ) Notice: Subject to any disclaimer, the term of this patent is extended or adjusted under 35 U.S.C. 154(b) by 67 days.

(21) Appl. No.: 14/249,416

(22) Filed: Apr. 10, 2014

(65) Prior Publication Data

US 2014/0307216 A1 Oct. 16, 2014

(30) Foreign Application Priority Data

Apr. 11, 2013 (JP) .................................. 2013-083283

(51) Int. Cl.
| | | |
|---|---|---|
| G02F 1/1345 | (2006.01) | |
| G02F 1/1337 | (2006.01) | |
| G09G 3/30 | (2006.01) | |
| G09G 3/36 | (2006.01) | |

(52) U.S. Cl.
CPC ......... *G02F 1/1345* (2013.01); *G02F 1/13458* (2013.01); *G02F 1/133784* (2013.01)

(58) Field of Classification Search
CPC ............. G02F 1/1345; G02F 1/13458; G02F 2001/13685; G02F 1/13452; G02F 1/13454; G02F 1/1339; G02F 2001/133388; G02F 1/1337; G02F 1/133711; G02F 1/134363
USPC .................................................. 349/151, 123
See application file for complete search history.

(56) References Cited

U.S. PATENT DOCUMENTS

| | | | | |
|---|---|---|---|---|
| 5,033,824 | A * | 7/1991 | Bohmer | G02F 1/1345 345/50 |
| 2002/0145697 | A1* | 10/2002 | Hoshina | G02F 1/13452 349/151 |
| 2003/0086041 | A1* | 5/2003 | Watanabe | G02F 1/136227 349/122 |
| 2004/0189923 | A1* | 9/2004 | Kondo | G02F 1/134363 349/141 |
| 2007/0273634 | A1* | 11/2007 | Fukami | G02F 1/133784 345/98 |
| 2008/0024475 | A1* | 1/2008 | Takenaka | G02F 1/13452 345/206 |
| 2013/0038518 | A1* | 2/2013 | Tagawa | G02F 1/1345 345/92 |

FOREIGN PATENT DOCUMENTS

| | | |
|---|---|---|
| CN | 1375864 A | 10/2002 |
| CN | 102792450 A | 11/2012 |
| JP | 9-244043 | 9/1997 |

OTHER PUBLICATIONS

Chinese Office Action dated May 5, 2016 regarding a corresponding Chinese Patent Application No. 201410142218.0.

* cited by examiner

*Primary Examiner* — Mike Qi
(74) *Attorney, Agent, or Firm* — Typha IP LLC

(57) ABSTRACT

Conductive rubbing sludge generated by rubbing attaches to side portions of chip-on-glass (COG) terminals and terminal wiring lines and possibly causes short-circuiting (leakage) between adjacent terminal wiring lines via particles included in an anisotropic conductive film (ACF) which connects bumps of a semiconductor chip such as a driver IC to COG terminals. In the liquid crystal display device, each terminal wiring line connected to a COG terminal has a projecting part designed to generate an area not subjected to rubbing.

10 Claims, 13 Drawing Sheets

FIG. 3
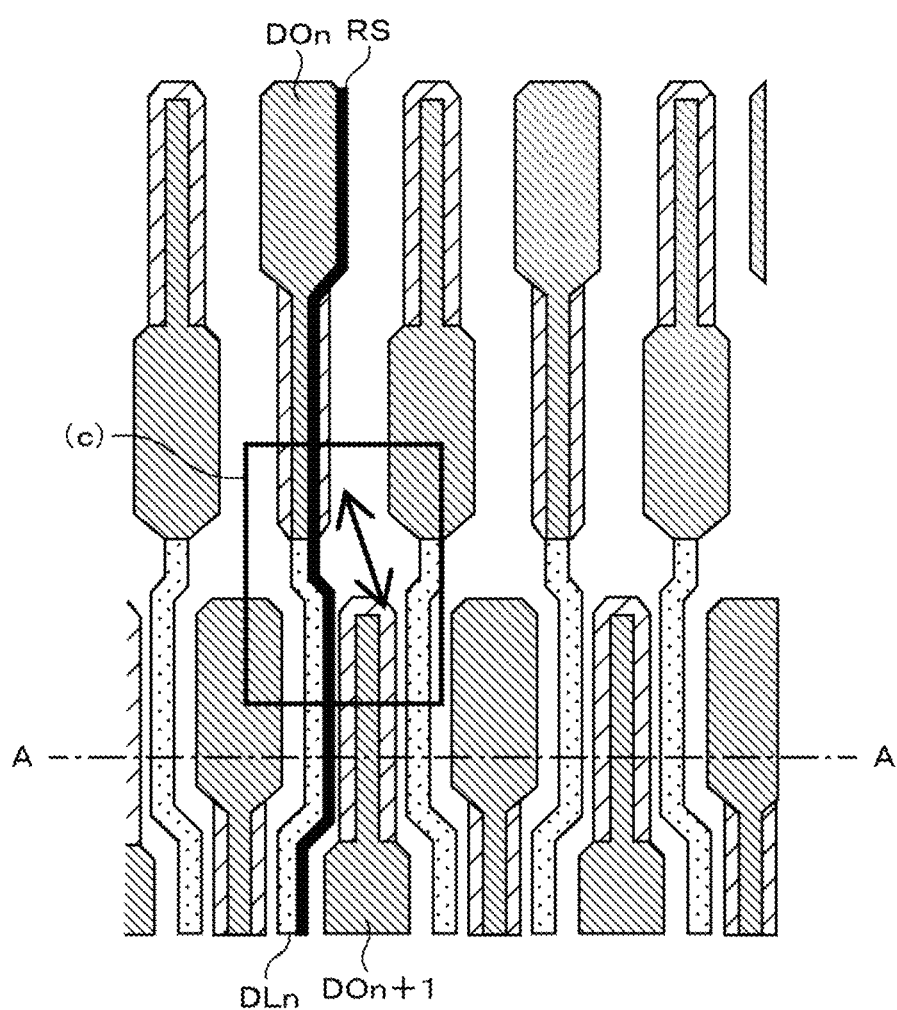
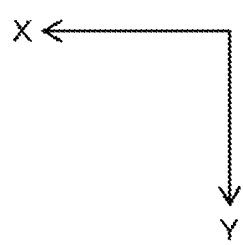

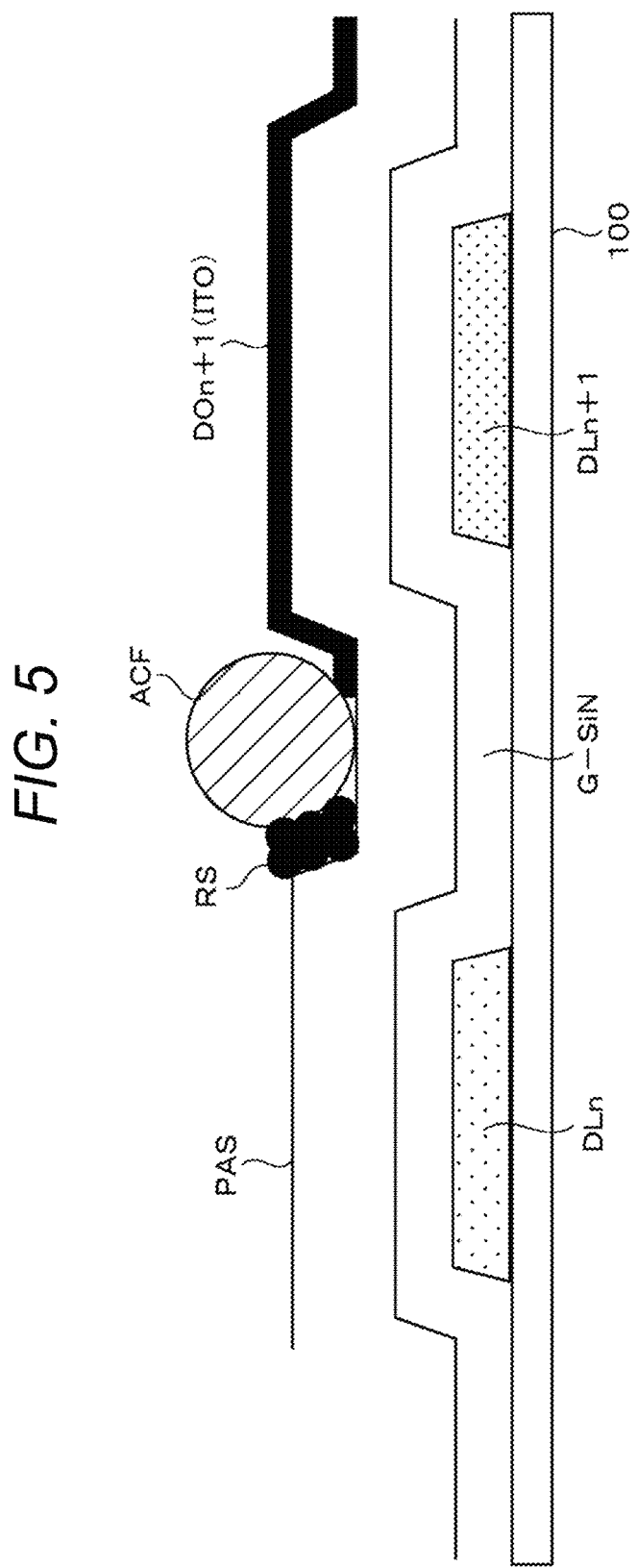

FIG. 7
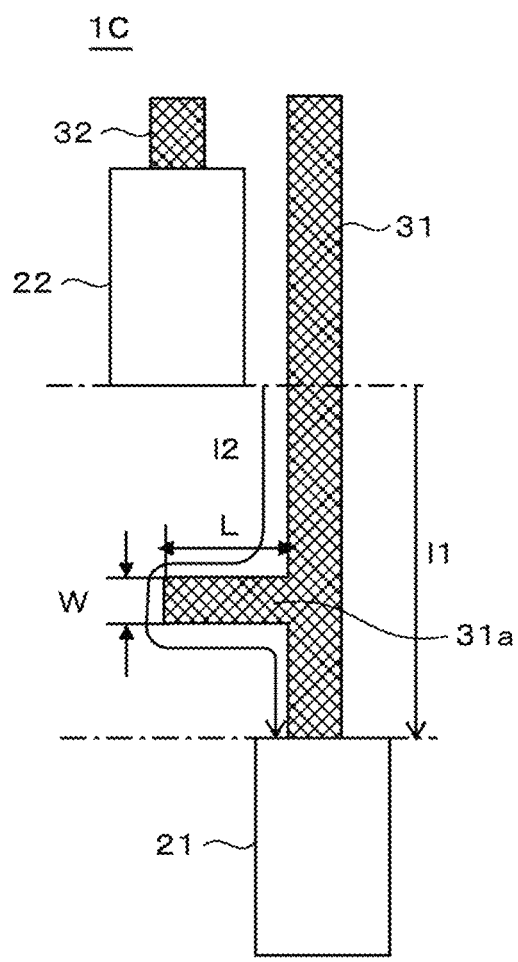
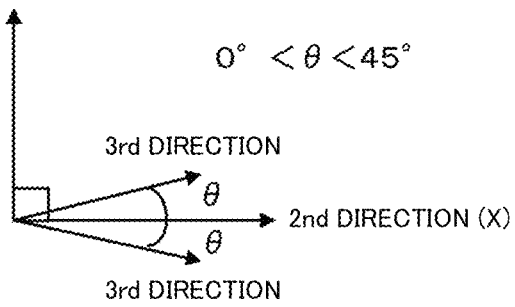

FIG. 8
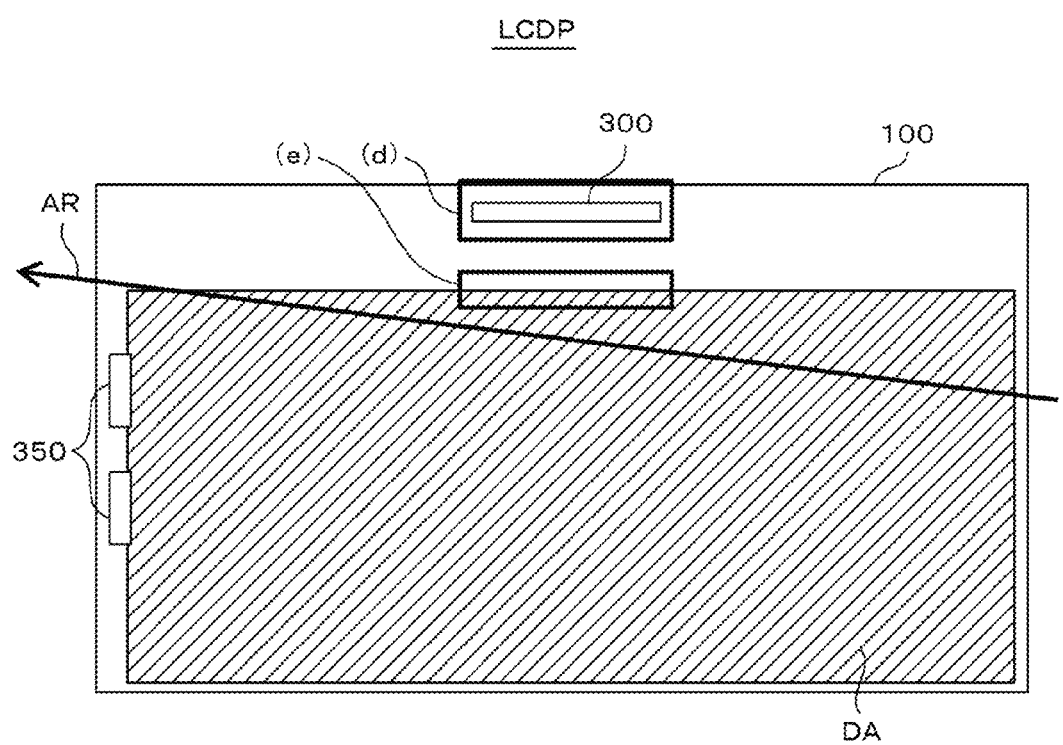
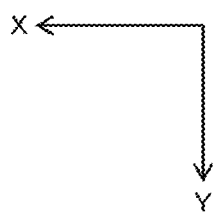

FIG. 9
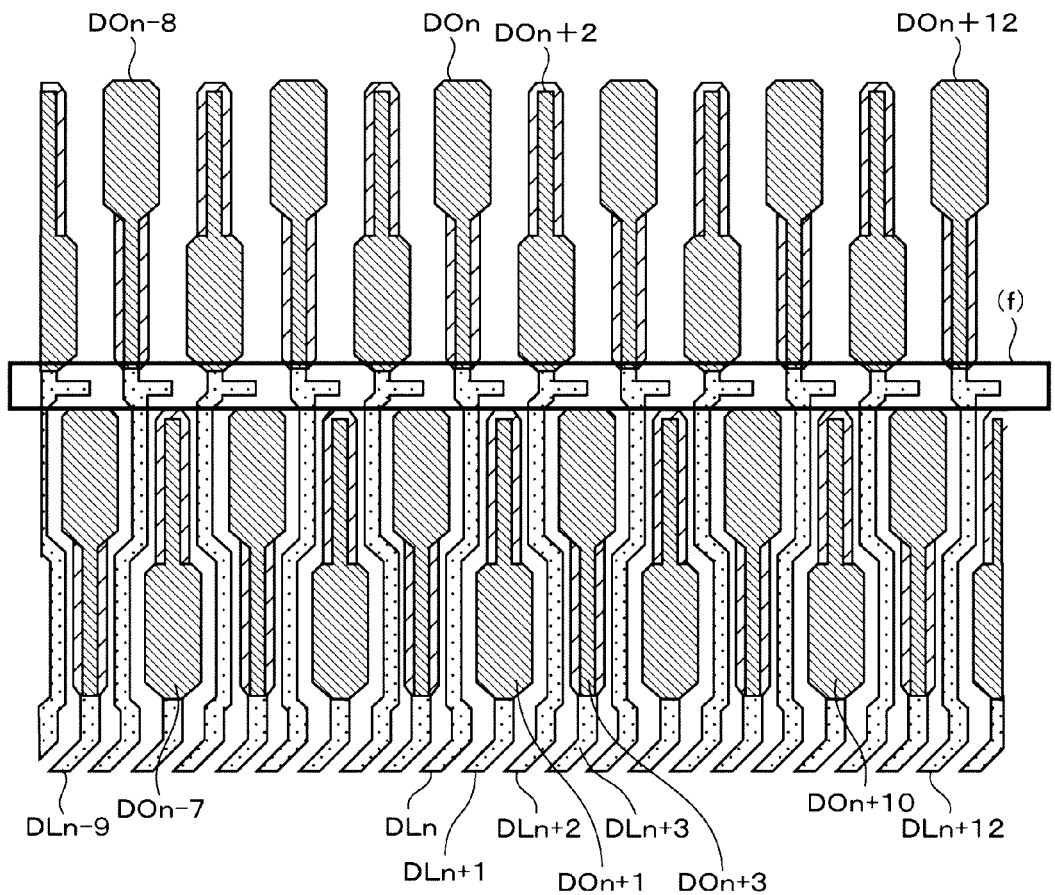
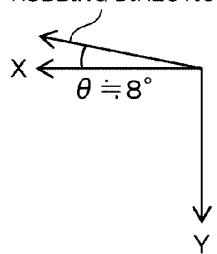

LIQUID CRYSTAL DISPLAY DEVICE

CLAIM OF PRIORITY

The present application claims priority from Japanese patent application JP2013-083283 filed on Apr. 11, 2013, the content of which is hereby incorporated by reference into this application.

BACKGROUND

The present invention relates to a liquid crystal display device, for example, to technology applicable to a terminal portion layout.

In an active-matrix liquid crystal display device, pixels are each composed by forming, in an area near an intersection of a scan line (hereinafter referred to as a "gate line") and a video signal line (also called as a source line or a drain line and hereinafter referred to as a "drain line"), a thin-film transistor (TFT) which is turned on by a scan signal from the gate line and a pixel electrode to which a video signal from the drain line is supplied via the thin-film transistor. A display area is where plural pixels are formed. The display area is surrounded by a peripheral area (frame area). The peripheral area includes semiconductor chips, chip-on-glass (COG) terminals, and wirings (terminal wiring lines). The semiconductor chips include video line drive circuits for driving drain lines and scan line drive circuits for driving gate lines. The COG terminals and wiring lines connect the gate lines and drain lines in the display area to the semiconductor chips.

In recent years, the numbers of pixels used in liquid crystal display devices have been increasing as their image resolution is enhanced to improve the recognizability of information displayed on them. Hence, the numbers of drain lines and gate lines used in liquid crystal display devices have also been increasing. Keeping pace with such a trend, the number of signals inputted to or outputted from each semiconductor chip used in liquid crystal display devices and the numbers of COG terminals and terminal wiring lines used in liquid crystal display devices have also been increasing. Against such a backdrop, a technique for forming semiconductor chips and many COG terminals and terminal wiring lines in a peripheral area of a limited size is needed.

In the display area of a liquid crystal display device, an alignment film is laid over a transparent conductive film and, to promote liquid crystal alignment, the surface of the alignment film is rubbed in a certain direction, thereby making it easy to align the liquid crystals in the direction of rubbing (see Japanese Patent Laid-Open No. H9 (1997)-244043).

SUMMARY

In a liquid crystal display device, terminal wiring lines are formed closely to one another in a peripheral area covered with no alignment film, and the present inventors have found out that rubbing of an alignment film formed over a display area causes the following problem.

When the alignment film is rubbed, conductive rubbing sludge is generated. The rubbing sludge attaches to side portions of COG terminals and terminal wiring lines and possibly causes short-circuiting (leakage) between adjacent terminal wiring lines via particles included in an anisotropic conductive film (ACF) which connects bumps of a semiconductor chip such as a driver IC to COG terminals.

Other problems to be solved by and novel features of the present invention will become apparent from the following description and the accompanying drawings.

A main means for solving the problems with a liquid crystal display device described in the present specification can be summarized as using a terminal wiring layout which can generate areas not subjected to rubbing in the liquid crystal display device.

The liquid crystal display device according to the present invention can reduce short-circuiting between terminal wiring lines.

BRIEF DESCRIPTION OF THE DRAWINGS

FIG. 3 shows a layout pattern of a terminal portion of the liquid crystal display device shown in FIG. 1.

FIG. 5 is a drawing for describing a problem with a terminal portion of the liquid crystal display device shown in FIG. 1.

FIG. 7 is a drawing for describing a structure of a liquid crystal display device according to another embodiment of the present invention.

FIG. 8 is a drawing for describing an overall structure of a liquid crystal display device according to a working example of the present invention.

FIG. 9 shows a layout pattern of a terminal portion of the liquid crystal display device according to the working example.

DESCRIPTION OF THE PREFERRED EMBODIMENTS

Figure 1:
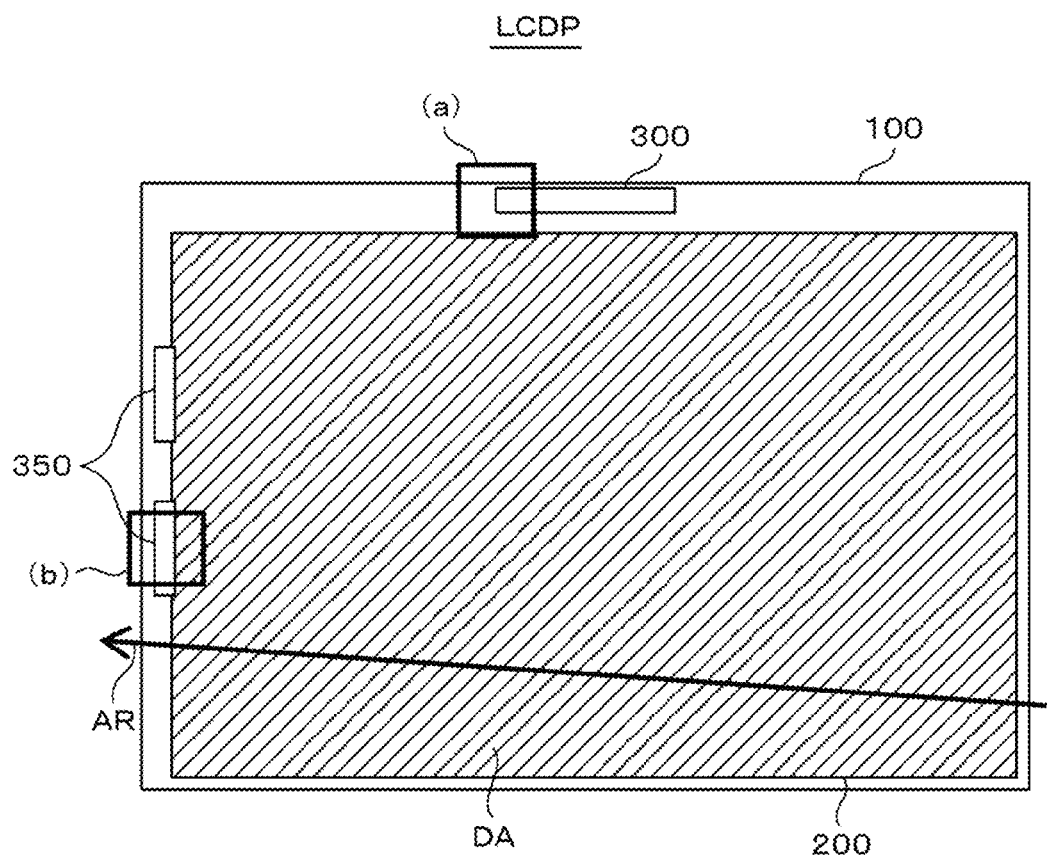
FIG. 1 is a drawing for describing an overall structure of a liquid crystal display device studied prior to the present invention.

Embodiments, a working example, and a modification example of the present invention will be described below with reference to drawings. In the following description, like parts will be denoted by like reference characters and their descriptions will not be repeated.

1. Technology Studied Beforehand

FIG. 1 is a drawing for describing an overall structure of a liquid crystal display device studied prior to the present invention. Referring to FIG. 1, a TFT substrate 100, on which pixel electrodes, thin-film transistors (TFTs), etc. are formed in a matrix pattern, has a counter substrate 200 layered thereover. Over the counter substrate 200, color filters are formed correspondingly to the pixel electrodes to enable color image formation. A liquid crystal layer is held between the TFT substrate 100 and the counter substrate 200. The liquid crystal layer contains liquid crystal molecules which control the optical transmittance of each pixel for image formation. The TFT substrate 100 and the counter substrate 200 make up a display area DA.

On the TFT substrate 100, plural video signal lines (drain lines) laterally arrayed (in X direction) with each line extending vertically (in Y direction) and plural scan lines (gate lines) vertically arrayed (in Y direction) with each line extending laterally (in X direction) are formed. A pixel is formed in each area surrounded by video signal lines and scan lines. Each pixel mainly includes a pixel electrode and a thin-film transistor (TFT) which is a switching element. Thus, the display area DA is composed of a large number of pixels formed in a matrix pattern. In the display area DA of the TFT substrate 100, first TFTs are formed, next an inorganic passivation film is formed over the TFTs, then pixel electrodes are formed over the passivation film. The inorganic passivation film is formed of an insulation film of, for example, silicon nitride (SiN). The pixel electrodes are each formed of a transparent conductive film, for example, indium tin oxide (ITO). The TFT substrate 100 is, for example, a glass substrate or an alternative insulating substrate formed of, for example, fused quartz or plastic (resin).

In the portion exposed without being covered by the counter substrate 200 of the TFT substrate 100, a drain driver IC 300 for driving the video signal lines and gate driver ICs 350 for driving the scan lines are placed. A flexible wiring substrate is also provided to have external power supplies and signals supplied from outside. The drain driver IC 300 and gate driver ICs 350 are each formed as a semiconductor chip. The drain driver IC 300 and gate driver ICs 350 may be combined into a single semiconductor chip to be disposed where the discrete drain driver IC 300 is disposed.

Figure 2:
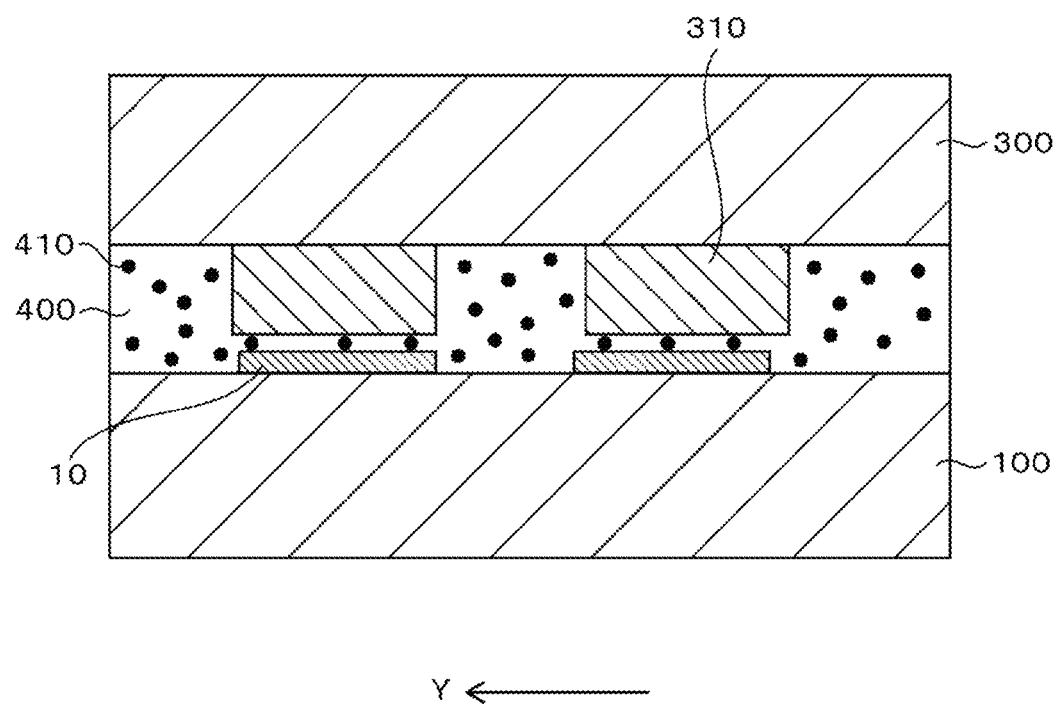
FIG. 2 is a sectional view of a portion where a drain driver IC is formed of the liquid crystal display device shown in FIG. 1.

FIG. 2 is a sectional view of the portion where the drain driver IC 300 is formed of the liquid display device shown in FIG. 1. As shown in FIG. 2, the drain driver IC 300 is connected, via an anisotropic conductive film (ACF) 400, to terminals 10 formed over the TFT substrate 100. Though not shown in FIG. 2, the terminals 10 each include wiring metal, a contact hole, and a transparent conductive film (ITO). The drain driver IC 300 and gate driver ICs 350 have bumps 310 for connection with terminals 10. Namely, the bumps 310 are connected, via the anisotropic conductive film 400, to the terminals 10 formed over the TFT substrate 100. Directly mounting semiconductor chips over a TFT glass substrate as in the present case is referred to as chip-on-glass (COG) mounting. The terminals 10 are also referred to as COG terminals.

The anisotropic conductive film 400 is a resin film in which conductive particles 410 are dispersed. When the drain driver IC 300 and gate driver ICs 350 are pressure-bonded to the TFT substrate 100, the bumps 310 and the terminals 10 are electrically connected via conductive particles 410. In the lateral direction (Y direction) as seen in FIG. 2, the pressure-bonded elements are not electrically interconnected with the conductive particles 410 being separated from one another.

As described above, a liquid crystal display device includes plural scan lines, plural video signal lines intersecting plural scan lines, a display area where plural pixels are formed, and a group of terminals formed outside the display area. The group of terminals include plural terminals 10 to supply signals to scan lines or video signal lines via terminal wiring lines.

As described above, in the display area DA, an alignment film is laid over the transparent conductive film (ITO). To promote liquid crystal alignment, the surface of the alignment film is rubbed in a certain direction, thereby making it easy for the liquid crystals to align in the direction of rubbing. In FIG. 1, the rubbing direction is represented by arrow AR. In cases where in-plane switching (IPS) technology is used in which liquid crystals are driven using a horizontal electric field, the rubbing direction is about 8 degrees shifted from the X direction.

FIG. 3 shows the layout pattern, studied prior to the present invention, of terminals in a portion (a) enclosed in a square in FIG. 1. Referring to FIG. 3, a drain output terminal DOn formed of a transparent conductive film (ITO) is connected with a drain line DLn formed of a gate layer (GAL). When the ITO is rubbed, its surface is rubbed off to generate rubbing sludge RS which contains indium (In) and attaches, via an insulation film as being described later, to side portions of the drain output terminal DOn and drain line DLn. In the layout pattern of FIG. 3, portions where the rubbing sludge RS attaches are shown only with regard to the drain terminal DOn and drain line DLn.

Referring to FIG. 3, the drain output terminal DOn includes a portion hatched rightward and downward and portions hatched rightward and upward. The portion hatched rightward and downward is connected, at its lower end, with a gate layer. The portions hatched rightward and upward are connected, at their lower ends, with no gate layer. This also applies to the drain output terminals not shown in FIG. 3 and the same applies with regard to FIGS. 9, 11, 12, and 13.

Figure 4A:
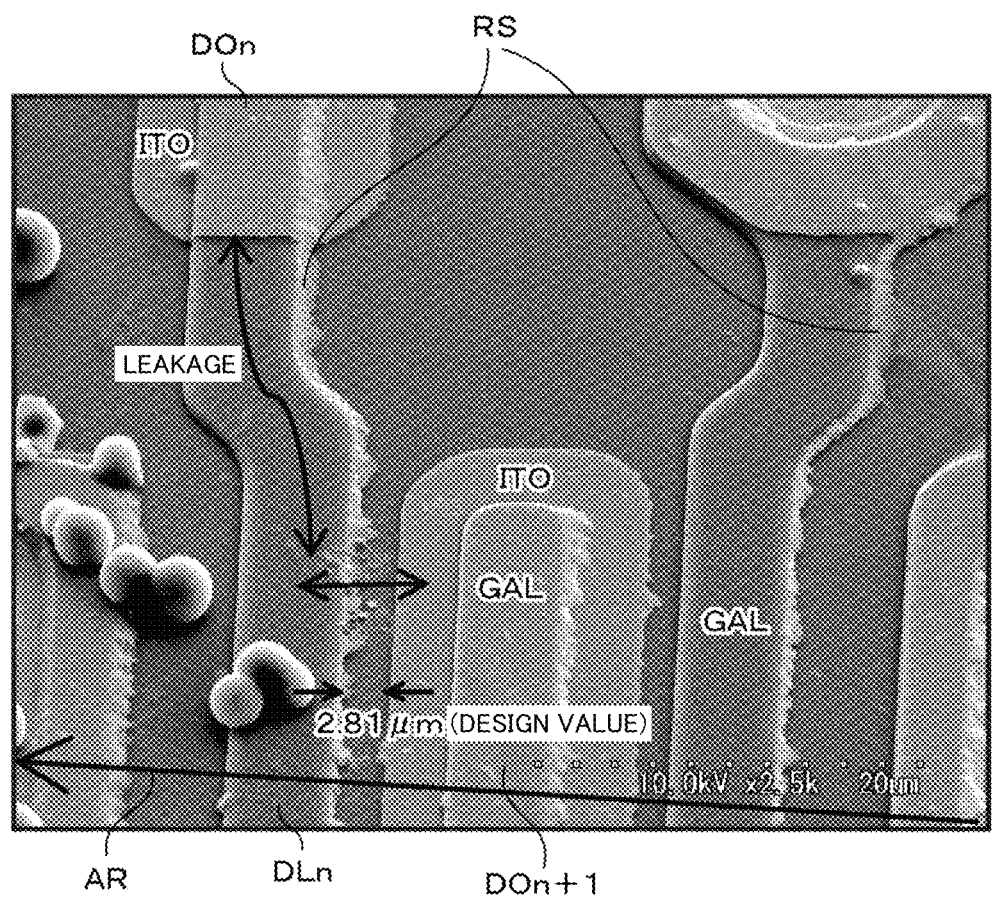
FIGS. 4A and 4B are each a photograph of a terminal portion of the liquid crystal display device shown in FIG. 1.

FIG. 4A is a photograph of a portion of a real device corresponding to a portion (c) enclosed in a rectangle in FIG. 3. In the photograph, rubbing sludge RS containing indium (In) is shown attaching to insulation films over right side walls of the drain output terminals DOn and DOn+1 and the drain line DLn. The distance between the drain output terminal DOn and the drain output terminal DOn+1 has been practically reduced by the rubbing sludge RS. Namely, the drain output terminal DOn electrically conducts to the rubbing sludge RS attached to the right side wall of the drain line DLn, as a result, causing the insulation film on the right side wall of the drain line DLn and the left side wall of the drain output terminal DOn+1 to oppose each other across a very small gap. The distance between the drain line DLn and the drain output terminal DOn+1 is designed to be, for example, 2.81 µM. The ball-like objects over the drain line DLn shown in FIG. 4A are ACF particles. There are cases in which ACF particles are positioned between the drain line DLn and the drain output terminal DOn+1 causing the drain output terminal DOn and the drain output terminal DOn+1 to be short-circuited via rubbing sludge. The ACF particles measure about 4 µm in diameter.

Figure 4B:
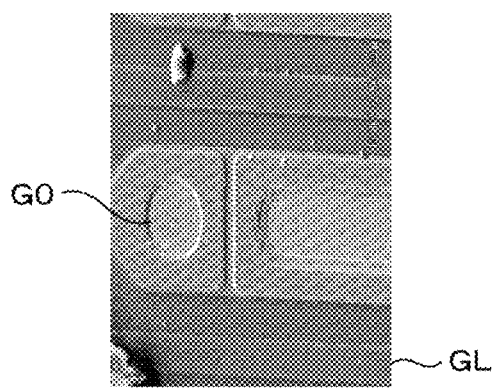

FIG. 4B is a photograph of a portion of a real device corresponding to a portion (b) enclosed in a square in FIG. 1. As shown in FIG. 4B, the opposing side walls of the gate output terminal GO and the adjacent gate line GL are free of rubbing sludge RS. This is because the angle formed between the rubbing direction AR and the direction in which the gate output terminal GO and the gate line GL extend is small.

FIG. 5 is a sectional view taken along chain line A-A in FIG. 3. As shown in FIG. 5, the drain lines DLn and DLn+1 formed of a metallic layer M1 are formed over the TFT substrate 100. The drain lines DLn and DLn+1 are covered with an insulation film (G-SiN) IF over which a passivation film (an insulation film) PAS is layered. The drain output terminal DOn+1 formed of a transparent conductive film (ITO) is formed over the passivation film PAS to be over the drain line DLn+1. Though not shown in FIG. 5, the drain line DLn+1 and the drain output terminal DOn+1 are connected to each other through a contact hole. Also, though not shown in FIG. 5, the drain output terminal DOn formed of a transparent conductive film (ITO) is formed on the passivation film PAS to be over the drain line DLn, and the drain line DLn and the drain output terminal DOn are connected to each other through a contact hole. Rubbing sludge RS generated by rubbing the alignment film is attached to the side wall of a dent formed on the passivation film PAS formed over the drain line DLn. In this state as shown in FIG. 5, the drain output terminal DOn+1 and the rubbing sludge RS are connected via an ACF particle. If the rubbing sludge RS ranges along the drain line DLn up to the drain output terminal DOn, the drain output terminals DOn and DOn+1 are short-circuited.

2. Embodiments

Figure 6A:
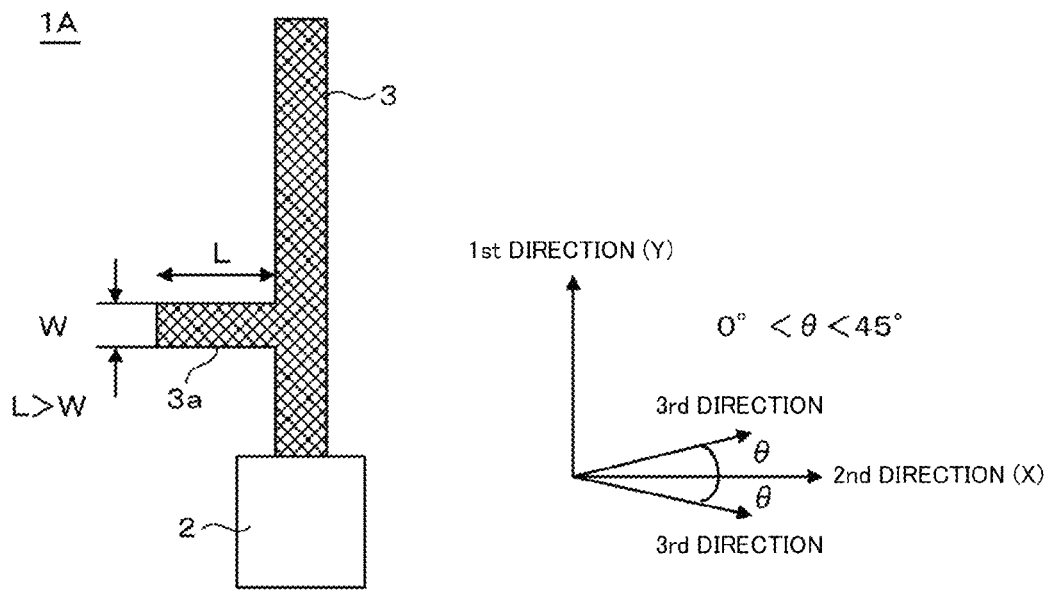
FIGS. 6A and 6B are each a drawing for describing a structure of a liquid crystal display device according to an embodiment of the present invention.
Figure 6B:
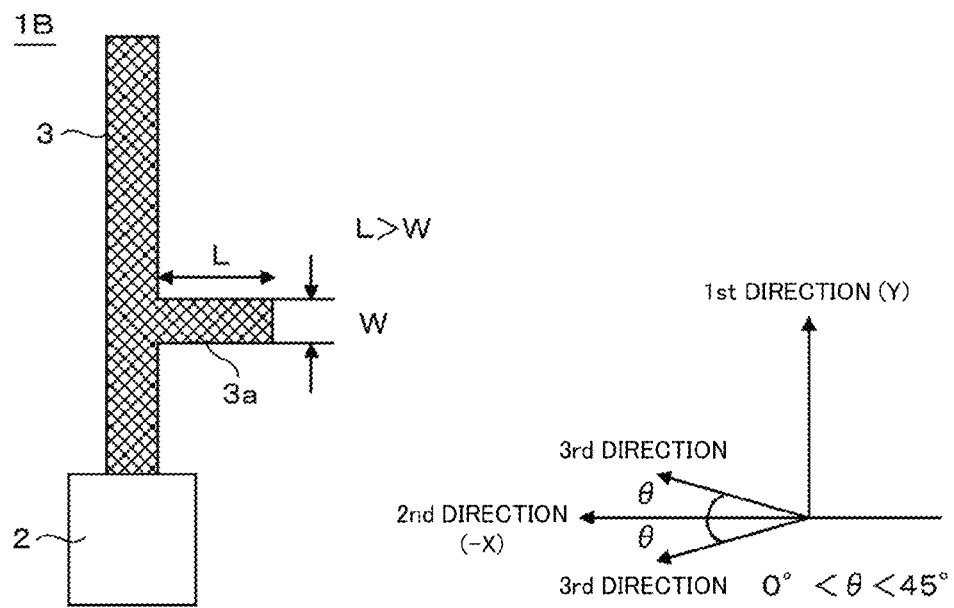

FIGS. 6A and 6B are drawings for describing the structures of liquid crystal display devices according to an embodiment of the present invention. Display devices 1A and 1B each have a terminal 2 and a wiring line 3 connected to the terminal 2. The terminal 2 is connected to a bump formed on a semiconductor chip. The wiring line 3 has a portion extending from the terminal 2 in a first direction (Y direction) toward a pixel electrode. The wiring 3 has a projecting part 3a extending from the wiring line 3 in a direction opposite to a second direction which intersects the first direction. The liquid crystal display devices 1A and 1B are each rubbed in a third direction shifted by a predetermined angle θ from the second direction.

To put the above differently, the liquid crystal devices 1A and 1B each have a display area which includes video signal lines extending in a first direction (Y direction) and scan lines extending in a second direction and a peripheral area outside the display area. The peripheral area includes a terminal 2 and a wiring line 3 connected to the terminal 2. The wiring line 3 has a portion extending from the terminal 2 in the first direction toward the display area. The wiring line 3 is connected to a video signal line or a scan line. The wiring line 3 has a projecting part 3a extending therefrom in a direction opposite to the second direction that intersects the first direction. The liquid crystal display devices 1A and 1B are each rubbed in a third direction shifted by a predetermined angle θ from the second direction.

To put the above still differently, the liquid crystal display devices 1A and 1B each have a TFT substrate and a semiconductor chip. The TFT substrate includes a gate wiring layer 3 extending in a first direction, a projection wiring layer 3a formed in the same layer as the gate wiring layer 3, and a terminal 2 formed of a transparent conductive film over the gate wiring layer 3. The semiconductor chip is connected with the terminal 2 via an anisotropic conductive tape. The projection wiring layer 3a extends from the gate wiring layer 3 in a direction opposite to a second direction which intersects a first direction. The liquid crystal display devices 1A and 1B are each rubbed in a third direction shifted by a predetermined angle θ from the second direction.

The liquid crystal display devices 1A and 1B structured as described above can have areas which are not rubbed and, hence, which stay free of rubbing sludge. This can reduce the generation of faults caused by rubbing sludge.

The projecting part (projection wiring layer) 3a is preferably quadrangular in a plan view as shown in FIGS. 6A and 6B. More preferably, the projecting part (projection wiring layer) 3a has a length (L) in the second direction larger than a length (W) in the first direction. Making the length L larger makes the un-rubbed areas larger, so that the generation of faults caused by rubbing sludge can be further reduced.

Also, preferably, the second direction perpendicularly intersects the first direction. In this case, the liquid crystal display devices 1A and 1B are each rubbed in the third direction shifted by a predetermined angle (θ), smaller than 45 degrees, from the second direction (X direction).

The semiconductor chip connected to the terminal 1 is, but not limited to, a drain driver IC. It may alternatively be a semiconductor chip including, for example, both a gate driver and a drain driver.

The liquid crystal display devices 1A and 1B shown in FIGS. 6A and 6B, respectively, differ in the rubbing direction, so that the projecting parts (projection wiring layer) 3a included in them project in opposite directions, respectively.

FIG. 7 is a drawing for describing the structure of a liquid crystal display device according to another embodiment of the present invention. A liquid crystal display device 1C has a first terminal 21, a first wiring line 31 connected to the first terminal 21, a second terminal 22, and a second wiring line 32 connected to the second terminal 22. The first wiring line 31 has a portion extending from the terminal 21 in a first direction (Y direction) toward a pixel electrode. The second wiring line 32 has a portion extending from the second terminal 22 in the first direction (Y direction) toward a pixel electrode. The first terminal 21 and the second terminal 22 are separated from each other in the first direction (Y direction). The first wiring line 31 has a portion opposing the second terminal 22. The first wiring line 31 has a projecting part 31a. The projecting part 31a is formed, between the first terminal 21 and the second terminal 22, on the side to which rubbing sludge can easily attach of the first wiring line 31.

Analyzing the above structure from a view point different from that used to analyze the structure shown in FIG. 6A, a total length (l2), between the first terminal 21 and the second terminal 22, of the side easily attached to by rubbing sludge of the first wiring line 31 is larger than a total length (l1), between the first terminal 21 and the second terminal 22, of the other side not easily attached to by rubbing sludge of the first wiring line 31. When the total length l2 is larger, the probability of rubbing sludge gaplessly attaching to the corresponding side of the first wiring line 31 is smaller, so that the generation of faults caused by rubbing sludge can be reduced.

Preferably, the first projecting part 31a extends from the first wiring line 31 in a direction opposite to a second direction (X) which intersects the first direction.

Also preferably, the projecting part 31a is quadrangular in a plan view. More preferably, the projecting part 31a has a length (L) in the second direction larger than a length (W) in the first direction. Making the length L larger increases the total length l2, so that the generation of faults caused by rubbing sludge can be further reduced.

Also, preferably, the second direction perpendicularly intersects the first direction (Y). In this case, the liquid crystal display device 1C is rubbed in the third direction shifted by a predetermined angle (θ), smaller than 45 degrees, from the second direction (X direction).

Working Example

A working example of the above embodiments will be described in the following. FIG. 8, which is basically the same as FIG. 1, is a drawing for describing the overall structure of a liquid crystal display device LCDP according to the present working example. In the following, therefore, the description already provided with reference to FIG. 1 will be omitted to avoid duplication. In the present working example, the connection between the drain driver IC 300 and the TFT substrate 100 in the liquid crystal display device LCDP is the same as represented in FIG. 2 showing a sectional view of where the drain driver IC is mounted in the liquid crystal display device.

FIG. 9 shows a layout pattern of a terminal portion, corresponding to a portion (d) enclosed in a rectangle in FIG. 8, according to the present working example. The drain terminals are arranged in a zigzag pattern in two rows. Namely, even-numbered drain terminals including DOn and DOn+2 are arranged in an upper row and odd-numbered drain terminals including DOn+1 and DOn+3 are arranged in a lower row. In each of the upper and lower rows, the adjacent drain terminals (for example, drain terminals DOn and DOn+2 in the upper row) are point-symmetrically formed. For example, as shown in FIG. 9, drain terminal DOn+1 is thinner in its upper half portion and wider in its lower half portion whereas drain terminal DOn+3 is wider in its upper half portion and thinner in its lower half portion. Also, all drain lines are uniformly thinly formed such that, even when the distance between, for example, drain terminal DOn+1 and drain terminal DOn+3 is reduced, a drain line DLn+2 can still be formed between them.

Referring to FIG. 9, the even-numbered drain lines (for example, drain lines DLn and DLn+2) each have a portion projecting in the direction opposite to the X direction as shown enclosed in a rectangle (f) between the upper-row drain terminals (for example, even-numbered drain terminals DOn and DOn+2) and the lower-row drain terminals (for example, odd-numbered drain lines DOn+1 and DOn+3). The rubbing direction of the liquid crystal display device is shifted, for example, upward (in −Y direction) by θ (≈8°) from the X direction.

The drain terminals DOn, DOn+1, DOn+2, DOn+3, ——— are each formed of a transparent conductive film (ITO layer M3). The drain lines DLn, DLn+1, DLn+2, DLn+3, ——— are each formed of a conductive film (gate layer M1). The ITO layer M3 forming the drain terminals and the gate layer M1 forming the drain lines are connected via contact holes formed in the insulation film formed over the gate layer M1.

Figure 10:
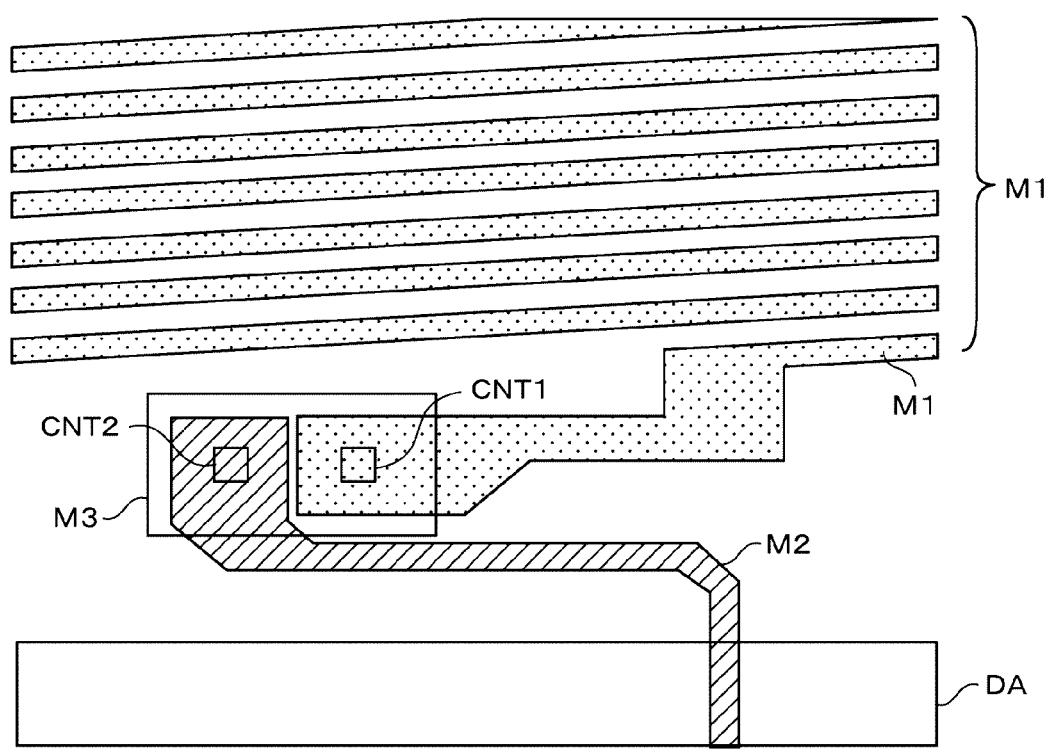
FIG. 10 shows a drain wiring layout pattern of the liquid crystal display device according to the working example.

FIG. 10 shows a drain wiring layout pattern, corresponding to a portion (e) enclosed in a rectangle in FIG. 8, according to the present working example. Each drain line formed of the gate layer M1 is converted into a drain line formed of a drain layer M2 via the ITO layer M3. The drain layer M2 is formed of a conductive film. The ITO layer M3 is connected to the gate layer M1 via a contact hole CNT1 formed in the insulation film over the gate layer M1 and to the drain layer M2 via a contact hole CNT2 formed in the insulation film over the drain layer M2. The drain line formed of the drain layer M2 extends in the Y direction in the display area DA.

Figure 11:
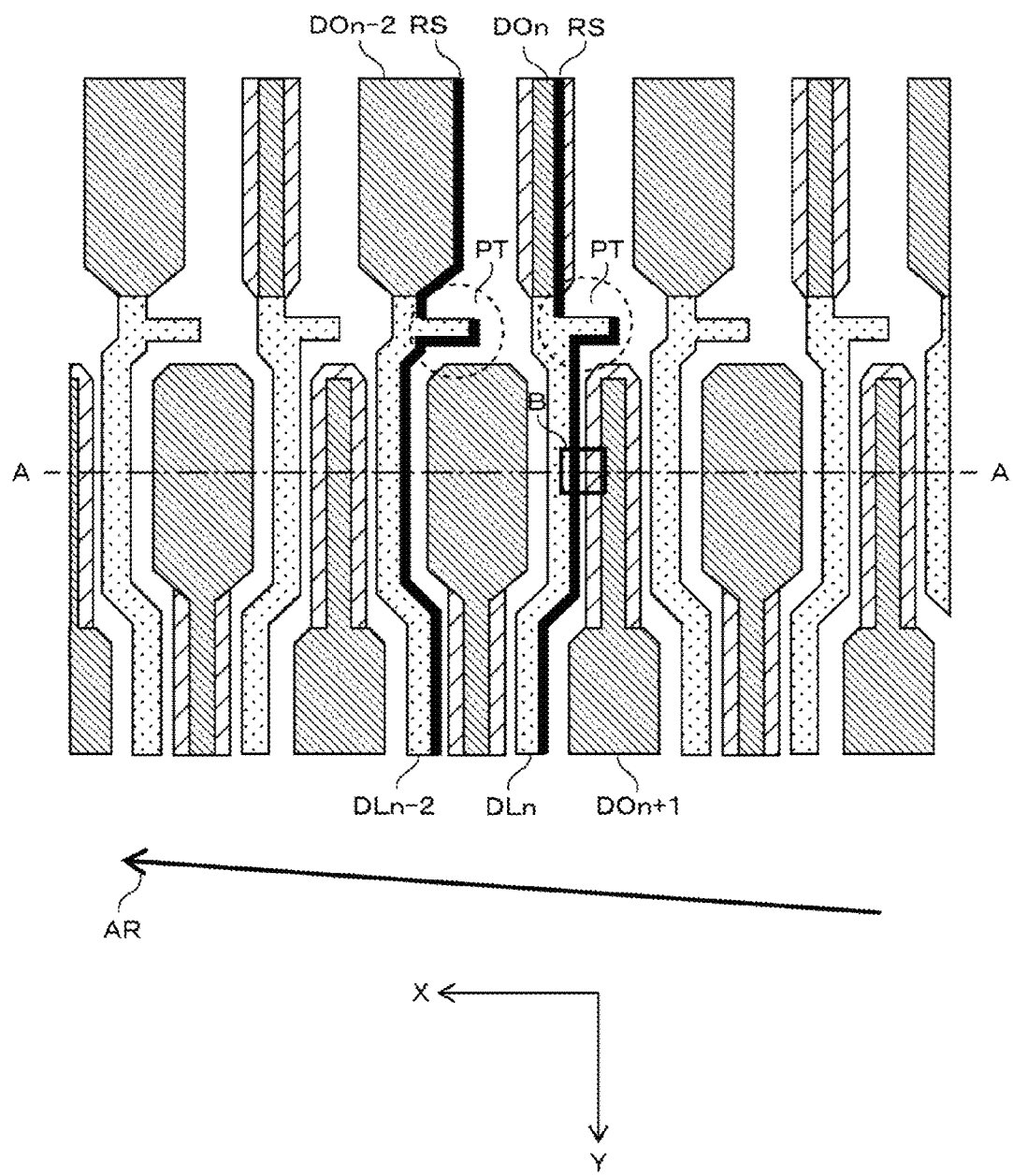
FIG. 11 is a drawing for describing an effect of a layout pattern of a terminal portion of the liquid crystal display device according to the working example.

FIG. 11 is a drawing for describing the effect of the layout pattern of a terminal portion according to the present working example. FIG. 11 represents a partial enlarged view of the layout pattern shown in FIG. 9 and corresponds to FIG. 3 showing the terminal layout pattern of the liquid crystal display device studied prior to the present invention. Drain output terminal DOn formed of a transparent conductive film (ITO) is connected to drain line DLn formed of a gate layer (GAL). When the ITO is rubbed, its surface is rubbed off to generate rubbing sludge RS which contains indium (In) and attaches to side portions of the drain output terminal DOn and drain line DLn. In the layout pattern shown in FIG. 11, portions where the rubbing sludge RS attaches are shown only with regard to the drain terminals DOn and DOn−2 and drain lines DLn and DLn−2. Note that the rubbing sludge RS does not attach to the upper side (the side toward the −Y direction) of the projecting part included in each of drain lines DLn and DLn−2. This is because the upper sides of the projecting parts are not subjected to rubbing performed in the rubbing direction. The sectional view along chain line A-A in FIG. 11 is the same as the sectional view shown in FIG. 5. Even if, in a portion B enclosed in a square in FIG. 11, short-circuiting is caused by an ACF particle as shown in FIG. 5, drain terminal DOn and drain terminal DOn+1 are not short-circuited because there is a rubbing-sludge free portion (the upper side of the projecting part PT) on the right of drain line DLn.

Figure 12:
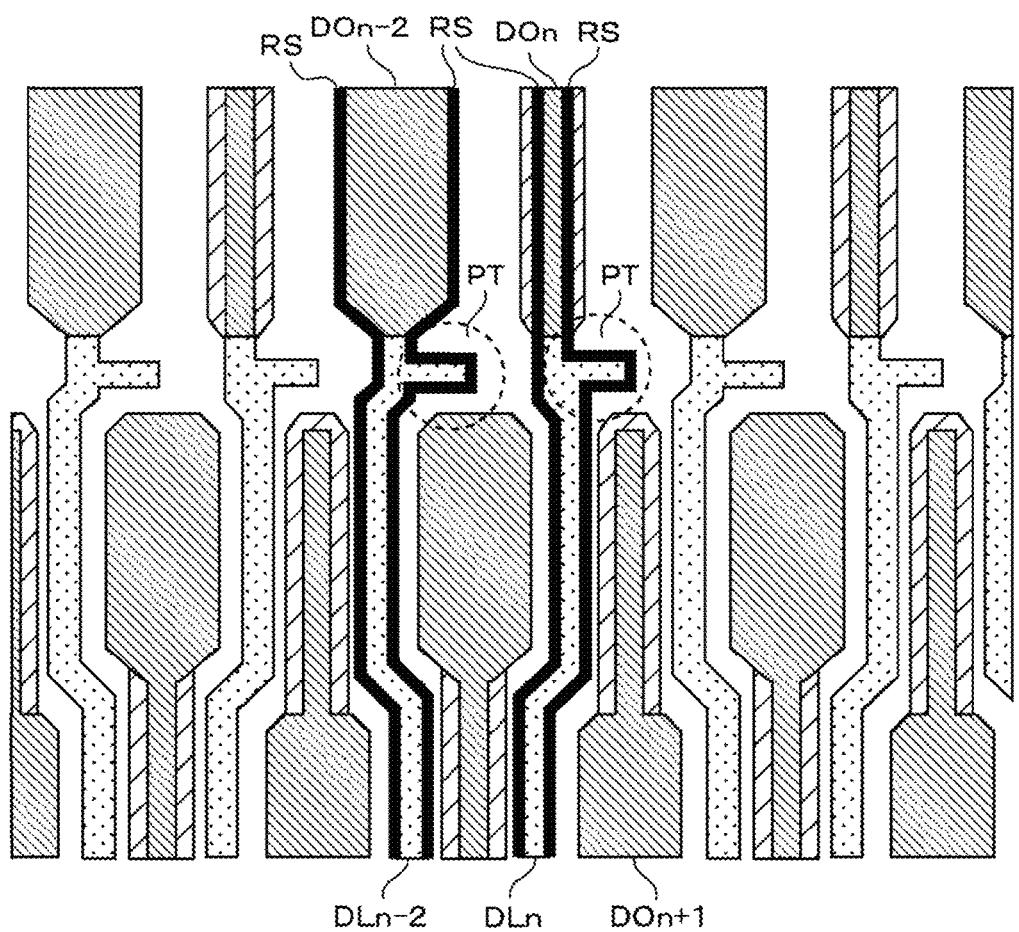
FIG. 12 is a drawing for describing an effect of double rubbing applied to terminals laid out according to the working example.

FIG. 12 is a drawing for describing the effect of double rubbing, i.e. rubbing performed in two directions, applied to terminals laid out according to the present working example. The layout pattern shown in FIG. 12 is the same as the layout pattern shown in FIG. 11. When double rubbing is applied to the layout pattern shown in FIG. 12, the rubbing sludge generated attaches to both sides of the drain lines as shown in FIG. 12. In the layout pattern of FIG. 12, portions where the rubbing sludge RS attaches are shown only with regard to the drain terminals DOn and DOn−2 and drain lines DLn and DLn−2. In the present case unlike in the case shown in FIG. 11, the rubbing sludge RS also attaches to the upper side of each projecting part PT. With each drain line having a projecting part PT, however, the short-circuiting path between drain terminals, for example, between drain terminal DOn and drain terminal DOn+1 is longer than in the drain pattern shown in FIG. 3. Hence, the probability of rubbing sludge gaplessly attaching to each of the drain terminals DOn and DOn−2 and drain lines DLn and DLn−2 is smaller than in the case shown in FIG. 3. Namely, compared with the case shown in FIG. 3, the probability of short-circuiting between adjacent drain terminals can be reduced.

Modification Example

Figure 13:
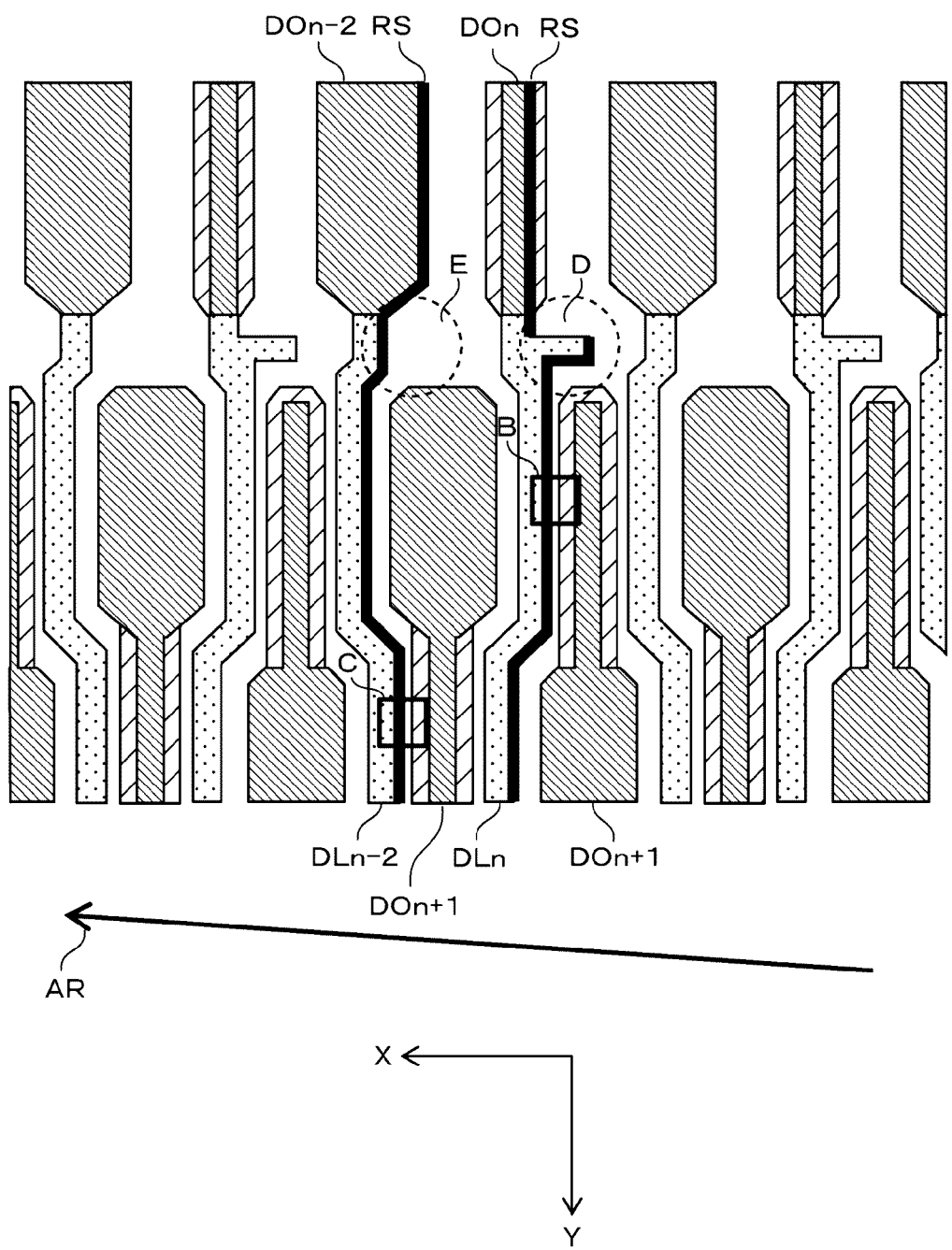
FIG. 13 is a drawing for describing an effect of a layout pattern of a terminal portion according to a modification example.

FIG. 13 shows a terminal layout pattern according to a modification example of the present working example. In the layout pattern of the present modification example compared with the layout pattern shown in FIG. 11, drain line DLn−2 has no projecting part in a portion E surrounded by a broken-line circle in FIG. 13. In the other respects, the present modification example is identical to the foregoing working example. Referring to FIG. 13, short-circuiting can be caused by ACF particles not only in a portion B enclosed in a square but also in a portion C also enclosed in a square. However, since the distance between drain terminal DOn−2 and the portion C is larger than the distance between drain terminal DOn and the portion B, the probability of rubbing sludge gaplessly attaching to the drain line portion between drain terminal DOn−2 and the portion C is smaller. Namely, the probability of short-circuiting between drain terminal DOn−2 and drain terminal DOn−1 is smaller than the probability of short-circuiting between drain terminal DOn and drain terminal DOn+1. Therefore, with a projecting part formed in portion D surrounded by a broken-line circle, the probability of short-circuiting between drain terminals can be reduced even with no projecting part formed in portion E also surrounded by a broken-line circle.

The invention made by the present inventors has been concretely descried based on embodiments, a working example, and a modification example, but the present invention is not limited to the embodiments, working example and modification example, and it can be modified in various ways.

The above description of the embodiments includes the following:

(1) A liquid crystal display device has a first terminal, a first wiring line connected to the first terminal, a second terminal, and a second wiring terminal connected to the second terminal. The first wiring line has a portion extending from the first terminal in a first direction toward a pixel electrode. The second wiring line has a portion extending from the second terminal in the first direction toward a pixel electrode. The first terminal and the second terminal are separated from each other in the first direction. The first wiring line has a portion opposing the second terminal. The first wiring line has a projecting part. The projecting part is formed, between the first terminal and the second terminal, on the side to which rubbing sludge can easily attach of the first wiring line.

(2) In the liquid crystal display device described in (1) above, the projecting part extends from the first wiring line in a direction opposite to a second direction which intersects the first direction.

(3) In the liquid crystal display device described in (2) above, the projecting part is quadrangular in a plan view.

(4) In the liquid crystal display device described in (3) above, the projecting part is longer in the second direction than in the first direction.

(5) In the liquid crystal display device described in (4) above, the second direction perpendicularly intersects the first direction and the liquid crystal display device is rubbed in a third direction shifted by a predetermined angle, smaller than 45 degrees, from the second direction.

What is claimed is:

1. A liquid crystal display device, comprising:
a display area which has a video signal line extending in a first direction and a scan line extending in a second direction, and
a peripheral area outside the display area,
wherein the peripheral area includes a plurality of terminals and a plurality of wiring lines connected to the terminals respectively, the terminals are arranged in a plurality of rows in the peripheral area,
wherein the terminals are electrically connected to other members via an anisotropic conductive film,
wherein each of the wiring lines has a portion extending from the terminals in a first direction toward the display area, is connected to the video signal line or the scan line, and has a projecting part extending therefrom in a direction opposite to a second direction which intersects the first direction, the projecting part is disposed between the rows of the terminals, and
wherein the liquid crystal display device is arranged to be rubbed in a third direction shifted by a predetermined angle from the second direction.

2. The liquid crystal display device according to claim 1, wherein the projecting part is quadrangular in a plan view.

3. The liquid crystal display device according to claim 2, wherein the projecting part is longer in the second direction than in the first direction.

4. The liquid crystal display device according to claim 3, wherein the second direction perpendicularly intersects the first direction and the predetermined angle is smaller than 45 degrees.

5. The liquid crystal display device according to claim 4, wherein the wiring lines are connected to the video signal.

6. A liquid crystal display device, comprising:
a TFT substrate; and
a semiconductor chip,
wherein the TFT substrate includes;
a gate wiring layer extending in a first direction,
a projection wiring layer formed of a same layer as the gate wiring layer, and
a plurality of terminals formed of a transparent conductive film over the gate wiring layer, the terminals are arranged in a plurality of rows in a peripheral area of the TFT substrate,
wherein the semiconductor chip is connected to the terminals via an anisotropic conductive film,
wherein the projection wiring layer is disposed between the rows of the terminals the projection wiring layer extends from the gate wiring layer in a direction opposite to a second direction which intersects the first direction, and
wherein the liquid crystal display device is arranged to be rubbed in a third direction shifted by a predetermined angle from the second direction.

7. The liquid crystal display device according to claim 6, wherein the projection wiring layer is quadrangular in a plan view.

8. The liquid crystal display device according to claim 7, wherein the projection wiring layer is longer in the second direction than in the first direction.

9. The liquid crystal display device according to claim 8, wherein the second direction perpendicularly intersects the first direction and the predetermined angle is smaller than 45 degrees.

10. The liquid crystal display device according to claim 9, wherein the semiconductor chip is a drain driver IC and is provide with a bump.

* * * * *